(12) United States Patent
Suzuki et al.

(10) Patent No.: US 9,933,074 B2
(45) Date of Patent: Apr. 3, 2018

(54) SLIDING SEAL AND SEAL STRUCTURE

(71) Applicants: KAWASAKI JUKOGYO KABUSHIKI KAISHA, Kobe-shi, Hyogo (JP); NISSAN MOTOR CO., LTD., Yokohama-shi, Kanagawa (JP)

(72) Inventors: Yutaka Suzuki, Kobe (JP); Kaoru Nomichi, Ono (JP); Makoto Ninomiya, Kobe (JP); Mikiya Shinohara, Yokohama (JP); Akinobu Moriyama, Yokohama (JP)

(73) Assignees: KAWASAKI JUKOGYO KABUSHIKI KAISHA, Kobe-shi (JP); NISSAN MOTOR CO., LTD., Yokohama-shi (JP)

( * ) Notice: Subject to any disclaimer, the term of this patent is extended or adjusted under 35 U.S.C. 154(b) by 77 days.

(21) Appl. No.: 14/654,577

(22) PCT Filed: Nov. 19, 2013

(86) PCT No.: PCT/JP2013/006784
§ 371 (c)(1),
(2) Date: Jun. 22, 2015

(87) PCT Pub. No.: WO2014/097538
PCT Pub. Date: Jun. 26, 2014

(65) Prior Publication Data
US 2015/0345639 A1    Dec. 3, 2015

(30) Foreign Application Priority Data
Dec. 20, 2012 (JP) ................................ 2012-278042

(51) Int. Cl.
*F16J 15/32* (2016.01)
*F16J 15/00* (2006.01)
(Continued)

(52) U.S. Cl.
CPC ............... *F16J 15/324* (2013.01); *F16F 9/32* (2013.01); *F16J 15/004* (2013.01); *F16J 15/006* (2013.01);
(Continued)

(58) Field of Classification Search
CPC .......... F16J 15/162; F16J 15/324; F16J 15/56; F16F 9/365
See application file for complete search history.

(56) References Cited

U.S. PATENT DOCUMENTS 2,544,537 A * 3/1951 Levy ..................... F16J 15/56
277/550
3,856,287 A * 12/1974 Freitag ................... F16F 9/365
188/269

(Continued)

FOREIGN PATENT DOCUMENTS

CN    102808885 A    12/2012
DE    1971284 U     10/1967
(Continued)

OTHER PUBLICATIONS

Jun. 29, 2016 Extended Search Report issued in European Patent Application No. 13 86 4560.1.
(Continued)

*Primary Examiner* — Nicholas L Foster
(74) *Attorney, Agent, or Firm* — Oliff PLC

(57) ABSTRACT

A sliding seal seals an annular gap between a first member and a second member to separate a high-pressure side and a low-pressure side from each other, the first member being movable relative to the second member. The sliding seal is provided at an annular attaching groove provided at the second member. The sliding seal includes: a pressure fluid seal configured to slidingly contact a sliding surface of the first member; and a lubricant holding piece provided at the (Continued)

high-pressure side of the pressure fluid seal, a lubricant storage space being formed between the lubricant holding piece and the pressure fluid seal.

7 Claims, 6 Drawing Sheets

(51) Int. Cl.
  *F16J 15/56* (2006.01)
  *F16F 9/36* (2006.01)
  *F16J 15/324* (2016.01)
  *F16J 15/3232* (2016.01)
  *F16F 9/32* (2006.01)

(52) U.S. Cl.
  CPC ......... *F16J 15/008* (2013.01); *F16J 15/3232* (2013.01); *F16J 15/56* (2013.01); *F16F 9/365* (2013.01)

(56) References Cited

U.S. PATENT DOCUMENTS

| | | | | |
|---|---|---|---|---|
| 4,030,716 | A | | 6/1977 | Freitag |
| RE29,497 | E | * | 12/1977 | Freitag ................. F16J 15/3204 188/269 |
| 4,221,367 | A | * | 9/1980 | Smith ..................... F16F 9/066 188/284 |
| 4,360,192 | A | * | 11/1982 | Ishida ..................... F16F 9/43 188/322.17 |
| 4,544,144 | A | * | 10/1985 | Ishida ..................... F16F 9/43 188/315 |
| 4,948,104 | A | * | 8/1990 | Wirges ................... F16J 15/40 188/322.17 |
| 5,011,121 | A | * | 4/1991 | Oriola .................... F16F 9/365 267/64.11 |
| 5,086,691 | A | * | 2/1992 | von Hatten ............. F16F 9/365 184/24 |
| 6,905,124 | B2 | * | 6/2005 | Zafar ..................... F16F 9/362 267/64.11 |
| 7,401,769 | B2 | * | 7/2008 | Kawahara ............. F16F 9/0218 188/322.17 |
| 2003/0052458 | A1 | | 3/2003 | Zafar |

FOREIGN PATENT DOCUMENTS

| | | |
|---|---|---|
| JP | S5133276 A | 3/1976 |
| JP | 2005502007 A | 1/2005 |
| JP | 2008257440 A | 10/2008 |
| JP | 2012195083 A | 10/2012 |

OTHER PUBLICATIONS

Jan. 7, 2014 International Search Report issued in International Application No. PCT/JP2013/006784.
Jan. 28, 2016 Office Action issued in Chinese Patent Application No. 201380065957.8.
May 2, 2017 Office Action issued in Chinese Patent Application No. 201380065957.8.
Renliang CAIA, Chemical Industry Press, "Sealing Technology of Process Equipments"; May 31, 2006, p. 125.

* cited by examiner

SLIDING SEAL AND SEAL STRUCTURE

TECHNICAL FIELD

The present invention relates to a sliding seal and a seal structure, each of which seals an annular gap between a first member and a second member, the first member being movable relative to the second member, and is applicable to, for example, a slide portion on which fluid pressure acts and which operates with a short stroke.

BACKGROUND ART

One example of a conventional sliding seal is a ring packing (see PTL 1, for example). This ring packing is used to appropriately manage sliding resistance between a tubular body and a shaft body. The tubular body slidably supports the shaft body which is displaced in conjunction with a diaphragm. The ring packing is attached to an outer periphery of the shaft body. The ring packing has an oval cross section. A concave groove is formed on an outer peripheral surface of the ring packing in a circumferential direction, the outer peripheral surface being opposed to an inner surface of the tubular body.

Grease is applied to an entire periphery of the ring packing, and especially, the grease is adequately applied to an inside of the concave groove. With this, even when the ring packing repeatedly slides in a vibrating manner by the vibrations of the diaphragm, the grease remains in the concave groove. Therefore, a sharp increase in the sliding resistance can be prevented.

CITATION LIST

Patent Literature

PTL 1: Japanese Laid-Open Patent Application Publication No. 2008-257440

SUMMARY OF INVENTION

Technical Problem

According to the above conventional ring packing, the concave groove can hold the grease. However, in a case where the cross-sectional size of the ring packing is small, the amount of grease held is small, so that an adequate amount of grease for realizing a long life of the ring packing cannot be held.

In addition, this ring packing does not have a function of preventing the grease in the concave groove from flowing out from the concave groove. Therefore, there is a possibility that since the shaft body repeatedly slides in the vibrating manner, the grease applied to the concave groove flows out from the concave groove, and therefore, the sharp increase in the sliding resistance cannot be prevented.

The present invention was made to solve the above problem, and an object of the present invention is to provide a long-life sliding seal and a long-life seal structure.

Solution to Problem

A sliding seal according to the present invention is a sliding seal configured to seal an annular gap between a first member and a second member to separate a high-pressure side and a low-pressure side from each other, the first member being movable relative to the second member, the sliding seal being arranged at an annular attaching groove provided at the second or first member, the sliding seal including: a pressure fluid seal configured to slidingly contact a sliding surface of the first or second member; and a lubricant holding piece provided at the high-pressure side of the pressure fluid seal, a lubricant storage space being formed between the lubricant holding piece and the pressure fluid seal.

According to the sliding seal of the present invention, the annular gap between the first member and the second member can be sealed by the pressure fluid seal. The lubricant storage space can hold a lubricant, and when the first member moves relative to the second member, the lubricant can lubricate a slide portion between the pressure fluid seal and the sliding surface. Therefore, start friction resistance and sliding friction resistance between the pressure fluid seal and the sliding surface can be reduced. Thus, abrasion of the pressure fluid seal can be reduced.

The lubricant held in the lubricant storage space formed at the high-pressure side of the pressure fluid seal is supplied to between the pressure fluid seal and the sliding surface by the pressure fluid sealed at the high-pressure side. With this, the slide portion can be lubricated satisfactorily.

The sliding seal according to the present invention may be configured such that the lubricant holding piece includes a lubricant storage portion.

With this, the amount of lubricant held by the lubricant storage space can be increased by the amount of lubricant held by the lubricant storage portion. Therefore, by this increased amount of lubricant, the start friction resistance and sliding friction resistance of the pressure fluid seal can be further made low for a long period of time. Thus, the abrasion resistance of the pressure fluid seal improves, so that the life of the pressure fluid seal can be increased.

The sliding seal according to the present invention may further include a lubricant seal provided at the high-pressure side of the lubricant storage space and configured to slidingly contact the sliding surface.

With this, the lubricant held in the lubricant storage space can be prevented by the lubricant seal from flowing out to the high-pressure side.

The sliding seal according to the present invention may be configured such that: a compression amount of a lip of the pressure fluid seal configured to slidingly contact the sliding surface is larger than a compression amount of a lip of the lubricant seal configured to slidingly contact the sliding surface.

With this, the role of the pressure fluid seal to secure the seal performance with respect to the high-pressure pressure fluid and the role of the lubricant seal to prevent the lubricant from flowing out can be made clear. Thus, the start friction resistance and sliding friction resistance of the entire sliding seal can be made low.

The sliding seal according to the present invention may be configured such that: the lubricant seal is provided at the lubricant holding piece; and the lubricant holding piece is arranged at the high-pressure side of the attaching groove.

With this, the high-pressure side of the attaching groove can be sealed by the lubricant holding piece and the lubricant seal. Since the lubricant seal is provided at the lubricant holding piece, the number of parts of the sliding seal can be reduced, and the labor of an assembling work of attaching the sliding seal to the second or first member can be reduced.

The sliding seal according to the present invention may be configured such that the lubricant seal is formed separately from the lubricant holding piece.

With this, the lubricant seal which slidingly contacts the sliding surface to generate the sliding friction can be made of a material having low friction resistance and high abrasion resistance, and the lubricant holding piece which does not contact the sliding surface can be made of a material different from the material of the lubricant seal. Therefore, choices of the material of each of the lubricant seal and the lubricant holding piece can be increased.

The sliding seal according to the present invention may be configured such that the lubricant seal is formed integrally with the lubricant holding piece.

With this, the number of parts of the sliding seal can be further reduced, and the labor of the assembling work can be reduced.

The sliding seal according to the present invention may further include a backup ring provided adjacent to a low-pressure side surface of the pressure fluid seal.

With this, when the first member moves relative to the second member, a tip end portion of the pressure fluid seal which is located at the sliding surface side can be prevented from getting into and being stuck in a gap between the sliding surface and the second or first member. This can prevent a decrease in a sealing degree at the high-pressure side.

A seal structure according to the present invention includes: the sliding seal according to any one of claims 1 to 8; and a supply passage formed at the second or first member at which the attaching groove is provided, a lubricant being supplied from outside through the supply passage to the lubricant storage space.

The seal structure according to the present invention includes the sliding seal according to the present invention, and the sliding seal acts in the same manner as above. When the amount of lubricant in the lubricant storage space decreases, the lubricant can be supplied from outside through the supply passage to the lubricant storage space. With this, a state where an appropriate amount of lubricant is supplied to the slide portion between the pressure fluid seal and the sliding surface can be maintained for a long period of time.

The seal structure according to the present invention may be configured such that: the lubricant storage portion is a groove portion which is open toward the sliding surface; and the groove portion and the supply passage communicate with each other through a communication hole formed at the lubricant holding piece.

As above, since the groove portion as the lubricant storage portion is open toward the sliding surface, the lubricant held in the groove portion can easily flow out through the opening of the groove portion to be supplied to the sliding surface. Thus, the lubrication between the pressure fluid seal and the sliding surface can be surely performed. Since the lubricant is supplied through the supply passage and the communication hole to the lubricant storage portion, the lubrication between the pressure fluid seal and the sliding surface can be continuously, surely performed.

Advantageous Effects of Invention

In the sliding seal and the seal structure according to the present invention, the lubricant storage space is formed between the pressure fluid seal and the lubricant holding piece provided separately from the pressure fluid seal. Therefore, a large space for holding the lubricant can be secured. The amount of lubricant flowing out from the lubricant storage space to the high-pressure side can be reduced by the lubricant seal, and the lubricant can be held in the lubricant storage space for a long period of time. Therefore, the start friction resistance and sliding friction resistance of the pressure fluid seal can be made low for a long period of time. Thus, the abrasion resistance of the pressure fluid seal improves, so that the life of the pressure fluid seal can be increased.

DESCRIPTION OF EMBODIMENTS

Hereinafter, a sliding seal and a seal structure according to Embodiment 1 of the present invention will be explained in reference to FIGS. 1 and 6. For example, as shown in FIG. 6, a sliding seal 11 can be used in an electromagnetic pressure regulating valve 40.

Even if upstream pressure is high, the electromagnetic pressure regulating valve 40 can control, for example, the flow rate (or pressure) of hydrogen to a fuel cell stack with a high degree of accuracy and prevent a hydrogen gas from leaking to the atmosphere.

Figure 6:
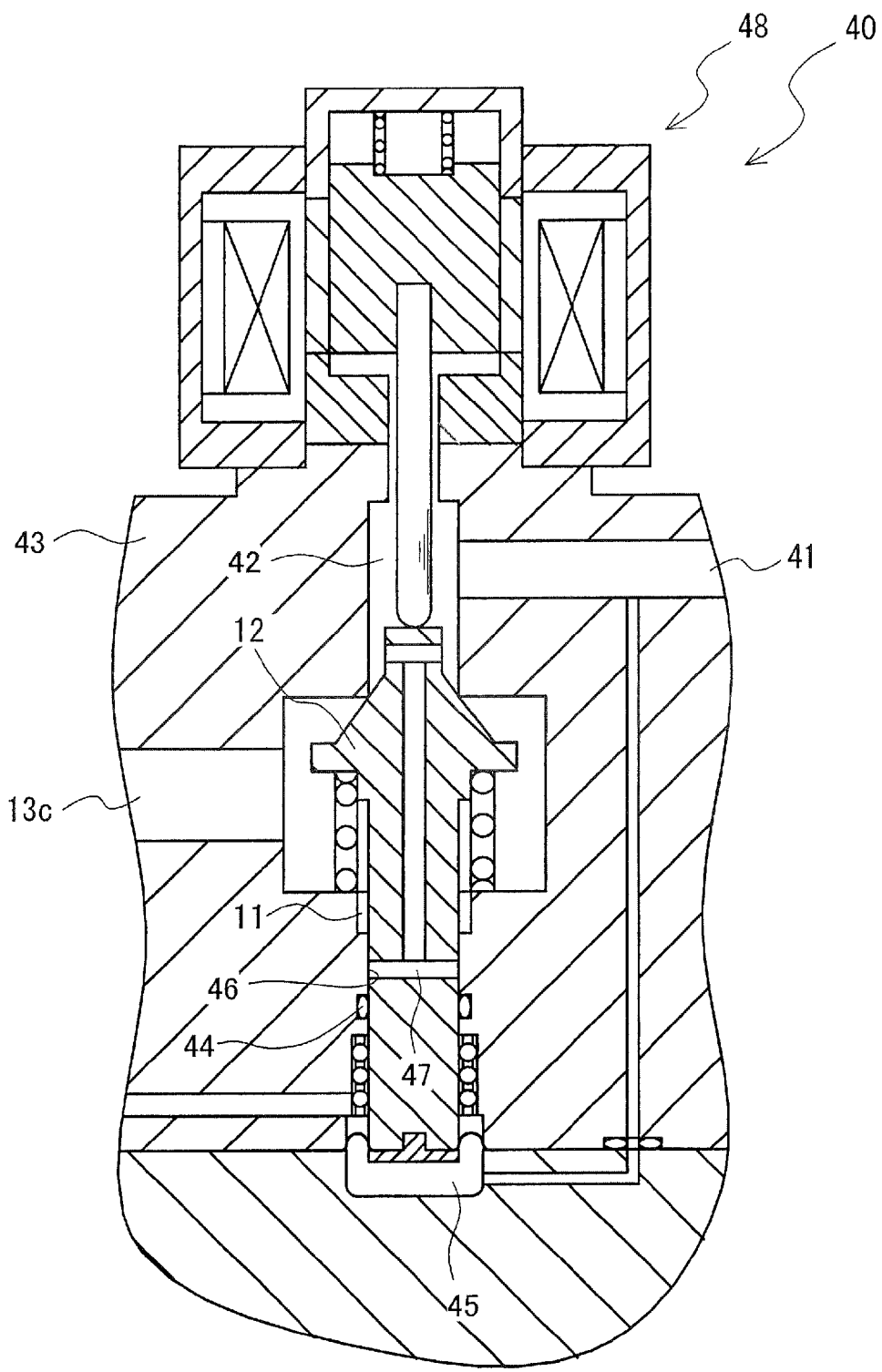
FIG. 6 is a cross-sectional view showing the configuration of an electromagnetic pressure regulating valve to which the sliding seal according to Embodiment 1 of the present invention is applied.

The electromagnetic pressure regulating valve 40 shown in FIG. 6 includes a housing (second member) 43, a valve element (first member) 12, a high-pressure seal member (sliding seal) 11, and a low-pressure seal member 44. The housing 43 includes a valve passage 42 connecting a primary port (high-pressure passage 13c) and a secondary port 41. The primary port is connected to a hydrogen tank, and the secondary port 41 is connected to a fuel cell stack. The valve element 12 is provided in the housing 43 and moves between a closed position and an open position to control an opening degree of the valve passage 42. The valve element 12 closes the valve passage 42 at the closed position and opens the valve passage 42 at the open position. The high-pressure seal member 11 and the low-pressure seal member 44 are arranged at an outer periphery of the valve element 12. One end of the valve element 12 is located at the valve passage 42 side, and the other end of the valve element 12 is located in a pressure return chamber 45 formed in the housing 43. The sliding seal 11 and the low-pressure seal member 44 are arranged in this order in a direction from the one end of the valve element 12 to the other end of the valve element 12. The electromagnetic pressure regulating valve 40 further includes a pressure equalizing passage 47 connecting the secondary port 41 and a first space 46 formed between the sliding seal 11 and the low-pressure seal member 44.

A reference sing 48 shown in FIG. 6 denotes an electromagnetic proportional solenoid. The electromagnetic proportional solenoid 48 moves the valve element (first member 12) in an open/close direction.

Figure 1:
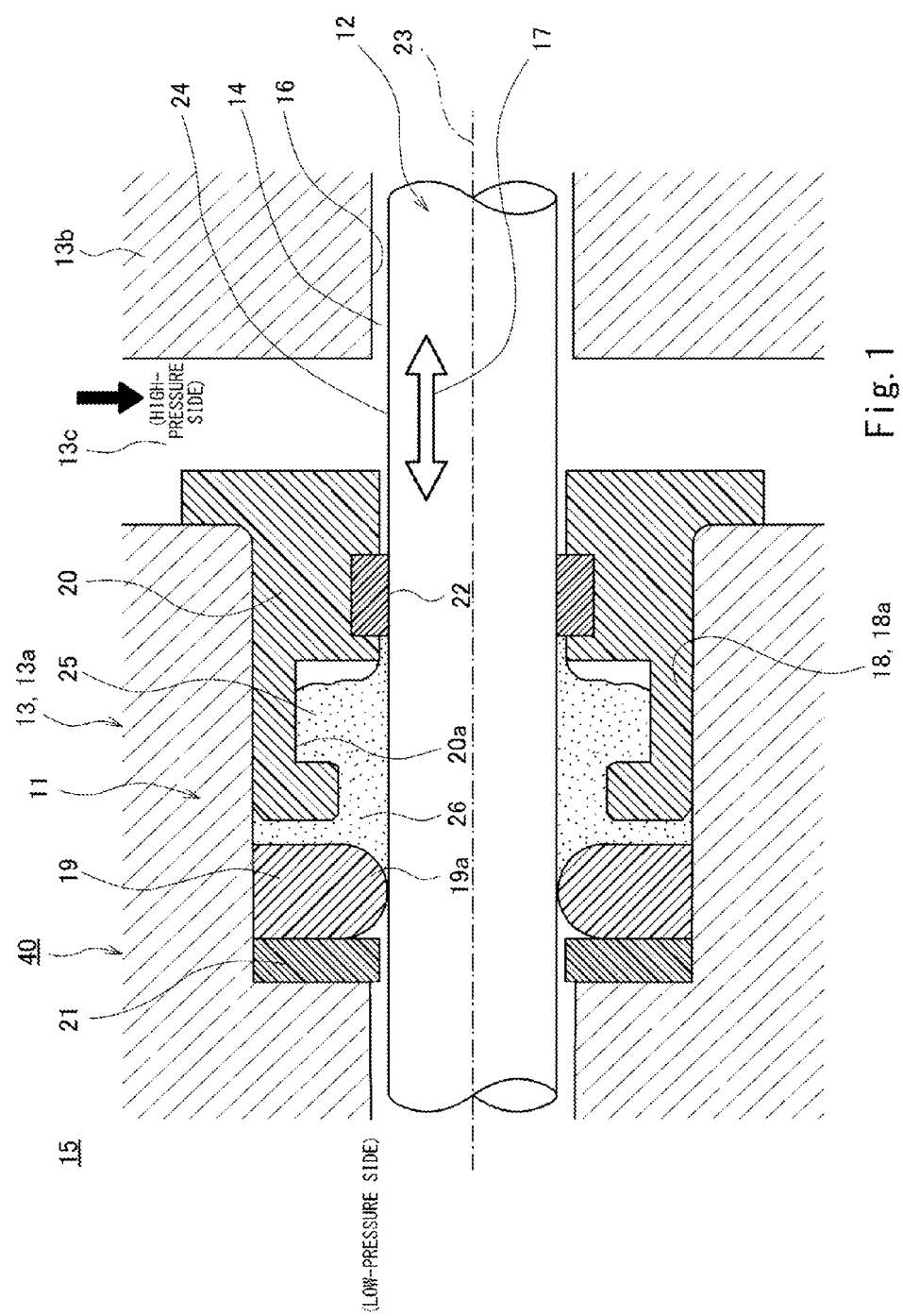
FIG. 1 is a cross-sectional view showing a state where a sliding seal according to Embodiment 1 of the present invention is attached to an attaching groove of a second member.

To be specific, as shown in FIG. 1, in a seal structure 40 using the sliding seal 11 shown in FIG. 6, the sliding seal 11 can seal an annular gap 14 between the first member 12 and the second member 43, the first member 12 being able to reciprocate relative to the second member 43. The seal structure 40 is suitable for a device 15 including the first member 12 on which pressure of a seal target fluid acts and which operates with a short stroke (for example, a stroke of not more than 2 mm). The seal target fluid (pressure fluid) is, for example, a gas, and the pressure thereof is from atmospheric pressure to 87.5 MPa.

The device 15 including the first and second members 12 and 13 shown in FIG. 1 is, for example, a pressure regulating valve. The first member 12 that is a sliding side is a valve element. A portion of the first member 12 shown in FIG. 1 is a columnar valve main body portion and is a part of the valve element. The second member 13 that is a fixed side is a housing including: a valve hole (not shown); the high-pressure passage 13c; and a cylindrical attachment hole 16. The valve hole (not shown) is opened or closed by the valve element. The high-pressure passage 13c is formed so as to communicate with the valve hole. The attachment hole 16 is formed so as to communicate with the high-pressure passage 13c. The valve main body portion (first member 12) is attached to the attachment hole 16 so as to be slidable in a movement direction 17 shown in FIG. 1. An annular attaching groove 18 is formed on an inner peripheral surface forming the attachment hole 16. A cross-sectional shape of the annular attaching groove 18 is a rectangular shape. The sliding seal 11 is attached to the attaching groove 18 having the rectangular cross section.

The second member 13 that is the housing includes a first housing portion 13a and a second housing portion 13b. By separating the first and second housing portions 13a and 13b from each other, the sliding seal 11 can be attached to and detached from the attaching groove 18.

In the present embodiment, the sliding seal 11 is used to secure a sealing performance of a slide portion which operates with a comparatively short stroke. However, instead of this, the sliding seal 11 may be used to secure the sealing performance of the slide portion which operates with a comparatively long stroke. The sliding seal 11 can be used for the slide portion of the device which is used for pressure other than the atmospheric pressure to 87.5 MPa.

Further, in the present embodiment, the sliding seal 11 is used in the pressure regulating valve. However, the sliding seal 11 may be used to secure the sealing performance of a device including a piston seal, a rod seal, or the like.

As shown in FIG. 1, the sliding seal 11 includes a pressure fluid seal (high-pressure seal) 19, a lubricant holding piece 20, a backup ring 21, and a lubricant seal 22, each of which has an annular shape. The backup ring 21 is provided adjacent to a low-pressure side surface of the pressure fluid seal 19. A low-pressure side surface of the backup ring 21 contacts an annular side wall surface of the attaching groove 18. The lubricant holding piece 20 is provided at a high-pressure side of the pressure fluid seal 19. A lubricant storage space 26 is formed between the lubricant holding piece 20 and the pressure fluid seal 19. The lubricant seal 22 is provided at the high-pressure side of the lubricant storage space 26 and fixed to an inner peripheral surface of the lubricant holding piece 20.

A material of the pressure fluid seal 19 is, for example, a thermoplastic elastomer. Specifically, the pressure fluid seal 19 is made of polyurethane. The thermoplastic elastomer has elasticity between the elasticity of a cross-linked rubber material and the elasticity of a resin material. It is preferable that the hardness of the thermoplastic elastomer be about 90 to 96 of JIS A (durometer A). In the present embodiment, a urethane-based (PU) elastomer is used. However, the material of the pressure fluid seal 19 is not limited to this, and various materials such as a styrene-based (SBC) elastomer, an olefine-based (TPO) elastomer, a vinyl chloride-based (TPVC) elastomer, an ester-based (TPEE) elastomer, and an amide-based (TPAE) elastomer can be used. Further, the pressure fluid seal 19 may be made of a rubber elastic body.

An outer peripheral surface of the pressure fluid seal 19 is formed in a substantially short cylindrical shape. A cross-sectional shape, including a center line 23 of the pressure fluid seal 19, of an inner peripheral portion 19a of the pressure fluid seal 19 is formed in a substantially semi-circular shape. The inner peripheral portion 19a slidably contacts a sliding surface 24 that is an outer peripheral surface of the first member 12.

The lubricant holding piece 20 may be made of any of various materials. For example, the lubricant holding piece 20 may be made of a synthetic resin or may be made of engineering plastic (PA, PC, or the like of general engineering plastic, or PES, PEEK, or the like of super engineering plastic) that is one of the synthetic resins. Further, the lubricant holding piece 20 may be made of iron.

As shown in FIG. 1, the lubricant holding piece 20 is attached such that a substantially short cylindrical outer peripheral surface thereof tightly contacts a bottom surface 18a of the attaching groove 18. A flange portion of the lubricant holding piece 20 which is provided at the high-pressure side tightly contacts an inner surface of the high-pressure passage 13c. For example, a method of fixing the lubricant holding piece 20 to the second member 13 may be a method of fastening the lubricant holding piece 20 to the second member 13 by screws or a method of pressing the lubricant holding piece 20 against the second member 13 by separate members. The lubricant holding piece 20 may be fixed by the other method.

A lubricant storage portion 20a is formed as an annular groove portion on the inner peripheral surface of the lubricant holding piece 20. The lubricant storage portion 20a as the groove portion is open toward the lubricant storage space 26 and the sliding surface 24 of the first member 12. A cross-sectional shape of the lubricant storage portion 20a is a rectangular shape or a trapezoidal shape which is open toward an opening side.

The lubricant storage space 26 and the lubricant storage portion 20a hold a lubricant 25 such as grease. The lubricant 25 lubricates a portion between the inner peripheral portion 19a of the pressure fluid seal 19 shown in FIG. 1 and the sliding surface 24 (outer peripheral surface) of the first member 12 (valve main body portion) which slidingly contacts and slides on the inner peripheral portion 19a.

The lubricant seal 22 seals to prevent the lubricant 25 held by the lubricant storage space 26 and the lubricant storage portion 20a from flowing out to the high-pressure side through the gap 14 between the inner peripheral surface of the lubricant holding piece 20 and the sliding surface 24 of the first member 12. The lubricant seal 22 is fixedly provided in a groove formed on the inner peripheral surface of the lubricant holding piece 20. The lubricant seal 22 slidably contacts the sliding surface 24 of the first member 12. For example, the lubricant seal 22 may be a felt-shaped scraper having high grease permeability, or may be made of a synthetic resin or a rubber elastic body.

The backup ring 21 holds the pressure fluid seal 19 at a position shown in FIG. 1. For example, the backup ring 21 may be made of a synthetic resin or may be engineering plastic (PA, PC, or the like of general engineering plastic, or PES, PEEK, or the like of super engineering plastic) that is one of the synthetic resins. High compressive force acts on the pressure fluid seal 19 by high pressure of the seal target fluid at the high-pressure side, and the backup ring 21 receives this compressive force.

Next, the actions of the sliding seal 11 and the seal structure 40 configured as above will be explained in reference to FIG. 1. The sliding seal 11 is attached to the attaching groove 18 formed on the inner peripheral surface of the attachment hole 16 of the second member 13 (housing). The first member 12 (the valve main body portion of the valve element) is movable relative to the attachment hole 16 in a left/right direction 17 shown in FIG. 1.

According to the sliding seal 11, the inner peripheral portion 19a of the pressure fluid seal 19 slidingly contacts the sliding surface 24 of the first member 12, and an outer peripheral portion of the pressure fluid seal 19 contacts the bottom surface 18a of the attaching groove 18. With this, the sliding seal 11 can seal the annular gap 14 between the sliding surface 24 of the first member 12 and the cylindrical inner peripheral surface forming the attachment hole 16 of the second member 13.

According to the sliding seal 11, the lubricant storage space 26 including the lubricant storage portion 20a can hold the lubricant 25, and when the first member 12 moves relative to the second member 13, the lubricant 25 can lubricate a slide portion between the pressure fluid seal 19 and the sliding surface 24. Therefore, start friction resistance and sliding friction resistance of the first member 12 to the second member 13 can be reduced, the start friction resistance and sliding friction resistance acting between the pressure fluid seal 19 and the sliding surface 24. Thus, abrasion of the pressure fluid seal 19 can be reduced.

The lubricant 25 held in the lubricant storage space 26 formed at the high-pressure side of the pressure fluid seal 19 is supplied to between the pressure fluid seal 19 and the sliding surface 24 by the pressure fluid sealed at the high-pressure side. With this, the slide portion can be lubricated satisfactorily. Thus, the lubricant 25 held in the lubricant storage space 26 including the lubricant storage portion 20a can be prevented by the lubricant seal 22 from flowing out to the high-pressure side.

Further, according to the sliding seal 11 and the seal structure 40 shown in FIG. 1, the lubricant storage space 26 is formed between the pressure fluid seal 19 and the lubricant holding piece 20 provided separately from the pressure fluid seal 19. Therefore, a large space for holding the lubricant 25 can be secured. The amount of lubricant 25 flowing out from the lubricant storage space 26 to the high-pressure side can be reduced by the lubricant seal 22, and the lubricant 25 can be held in the lubricant storage space 26 for a long period of time. Therefore, the start friction resistance and sliding friction resistance of the pressure fluid seal 19 can be made low for a long period of time. Thus, the abrasion resistance of the pressure fluid seal 19 improves, so that the life of the pressure fluid seal 19 can be increased.

Since the lubricant storage portion 20a (groove portion) is formed at the lubricant holding piece 20, the amount of lubricant 25 held by the lubricant storage space 26 can be increased by the amount of lubricant 25 held by the lubricant storage portion 20a. Therefore, by this increased amount of lubricant 25, the start friction resistance and sliding friction resistance of the pressure fluid seal 19 can be further made low for a long period of time. Thus, the abrasion resistance of the pressure fluid seal 19 improves, so that the life of the pressure fluid seal 19 can be increased.

Since the lubricant seal 22 is provided separately from the pressure fluid seal 19, a slidingly contacting force of the lubricant seal 22 with respect to the sliding surface 24 (for example, a crush rate of a lip of the lubricant seal 22) may be set such that the lubricant 25 held in the lubricant storage space 26 can be prevented from flowing out to the high-pressure side. The slidingly contacting force of the lubricant seal 22 with respect to the sliding surface 24 can be made lower than a slidingly contacting force of the pressure fluid seal 19 with respect to the sliding surface 24 (for example, a crush rate of a lip of the pressure fluid seal 19). Therefore, the start friction resistance and sliding friction resistance of the lubricant seal 22 can be made low. Thus, the abrasion resistance of the lubricant seal 22 improves, so that the life of the lubricant seal 22 can be increased.

The start friction resistance and sliding friction resistance of each of the pressure fluid seal 19 and the lubricant seal 22 can be made low by the action of the lubricant 25 for a long period of time. Therefore, the sliding seal 11 and the seal structure 40 are applicable to a case where the friction resistance needs to be low.

Further, the start friction resistance and sliding friction resistance of the entire sliding seal 11 can be made low, so that the life of the sliding seal 11 can be increased.

The lubricant storage space 26 is not formed at the first or second member 12 or 13 but formed between the pressure fluid seal 19 and the lubricant holding piece 20, and the lubricant storage portion 20a is formed at the lubricant holding piece 20. Therefore, the machining and formation of the lubricant storage space 26 including the lubricant storage portion 20a are easy, and the amount of lubricant held can be increased at low cost.

As shown in FIG. 1, the lubricant seal 22 is provided at the lubricant holding piece 20, and the lubricant holding piece 20 is provided so as to contact the bottom surface 18a of the attaching groove 18. With this, an opening of the attaching groove 18 which faces the high-pressure side can be sealed by the lubricant holding piece 20 and the lubricant seal 22. By providing the lubricant seal 22 at the lubricant holding piece 20, the number of parts of the sliding seal 11 can be reduced, and the labor of an assembling work of attaching the sliding seal 11 to the second member 13 can be reduced.

Further, the lubricant seal 22 is formed separately from the lubricant holding piece 20. With this, the lubricant seal 22 which slidingly contacts the sliding surface 24 to generate the sliding friction can be made of a material having low friction resistance and high abrasion resistance, and the lubricant holding piece 20 which does not contact the sliding surface 24 can be made of a material, such as a synthetic resin or iron, which is different from the material of the lubricant seal 22. Therefore, choices of the material, shape, and size of each of the lubricant seal 22 and the lubricant holding piece 20 can be increased. On this account, the cost and labor of the production of the sliding seal 11 can be reduced.

As shown in FIG. 1, the backup ring 21 is provided adjacent to the low-pressure side surface of the pressure fluid seal 19. The backup ring 21 can be used according to need depending on the pressure at the high-pressure side.

The backup ring 21 can prevent a case where when the first member 12 moves relative to the second member 13, the inner peripheral portion 19a (tip end portion) of the pressure fluid seal 19 which is located at the sliding surface 24 side gets into and is stuck in the gap between the sliding surface 24 and the first housing portion 13a of the second member 13. This can prevent a decrease in a sealing degree of the pressure fluid seal 19.

The backup ring 21 is made of such a material that even if the inner peripheral portion 19a of the pressure fluid seal 19 gets into a gap between an inner peripheral surface of the backup ring 21 and the sliding surface 24, the inner peripheral portion 19a is not damaged.

Next, the sliding seal according to Embodiment 2 of the present invention will be explained in reference to FIG. 2. A sliding seal 29 according to Embodiment 2 shown in FIG. 2 and the sliding seal 11 according to Embodiment 1 shown in FIG. 1 are different from each other in that: in Embodiment 1 shown in FIG. 1, the lubricant seal 22 is formed separately from the lubricant holding piece 20; and in Embodiment 2 shown in FIG. 2, the lubricant seal 22 is formed integrally with the lubricant holding piece 20. The lubricant seal 22 and the lubricant holding piece 20 formed integrally with each other are made of, for example, a synthetic resin.

Figure 2:
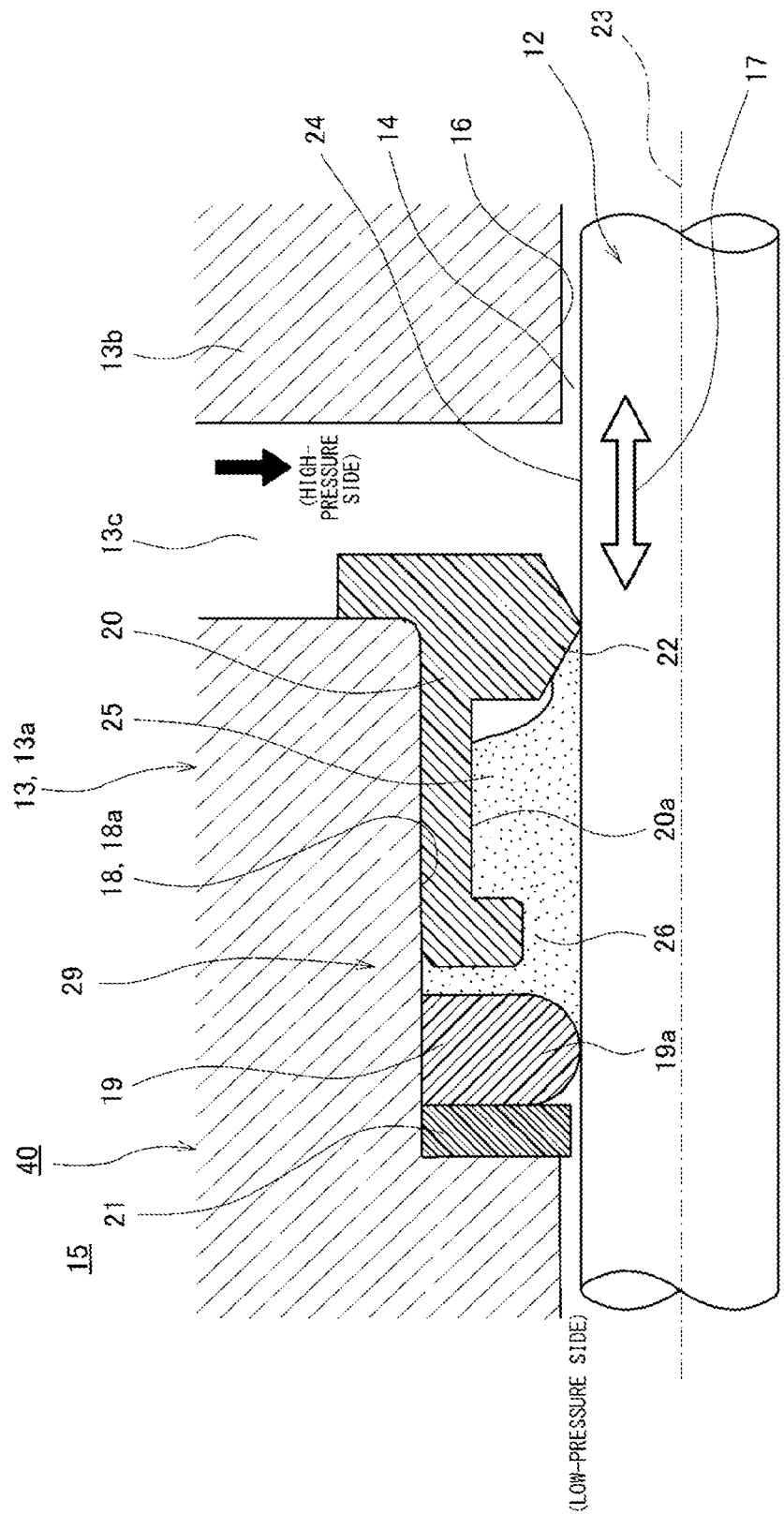
FIG. 2 is a partial schematic cross-sectional view showing a state where the sliding seal according to Embodiment 2 of the present invention is attached to the attaching groove of the second member.

Other than the above, Embodiment 2 shown in FIG. 2 is the same in configuration as Embodiment 1 shown in FIG. 1 and acts in the same manner as Embodiment 1 shown in FIG. 1. Therefore, the same reference signs are used for the same components, and explanations thereof are omitted.

According to the sliding seal 29 of Embodiment 2, the number of parts of the sliding seal 29 can be further reduced, and the labor of the assembling work can be reduced.

Next, the seal structure according to Embodiment 3 of the present invention will be explained in reference to FIG. 3. A seal structure 36 according to Embodiment 3 shown in FIG. 3 and the seal structure 40 according to Embodiment 1 shown in FIG. 1 are different from each other in that: in Embodiment 1 shown in FIG. 1, a supply passage 37 is not provided, through which the lubricant 25 is supplied from outside to the lubricant storage space 26 including the lubricant storage portion 20a; and in Embodiment 3 shown in FIG. 3, the supply passage 37 is provided.

Figure 3:
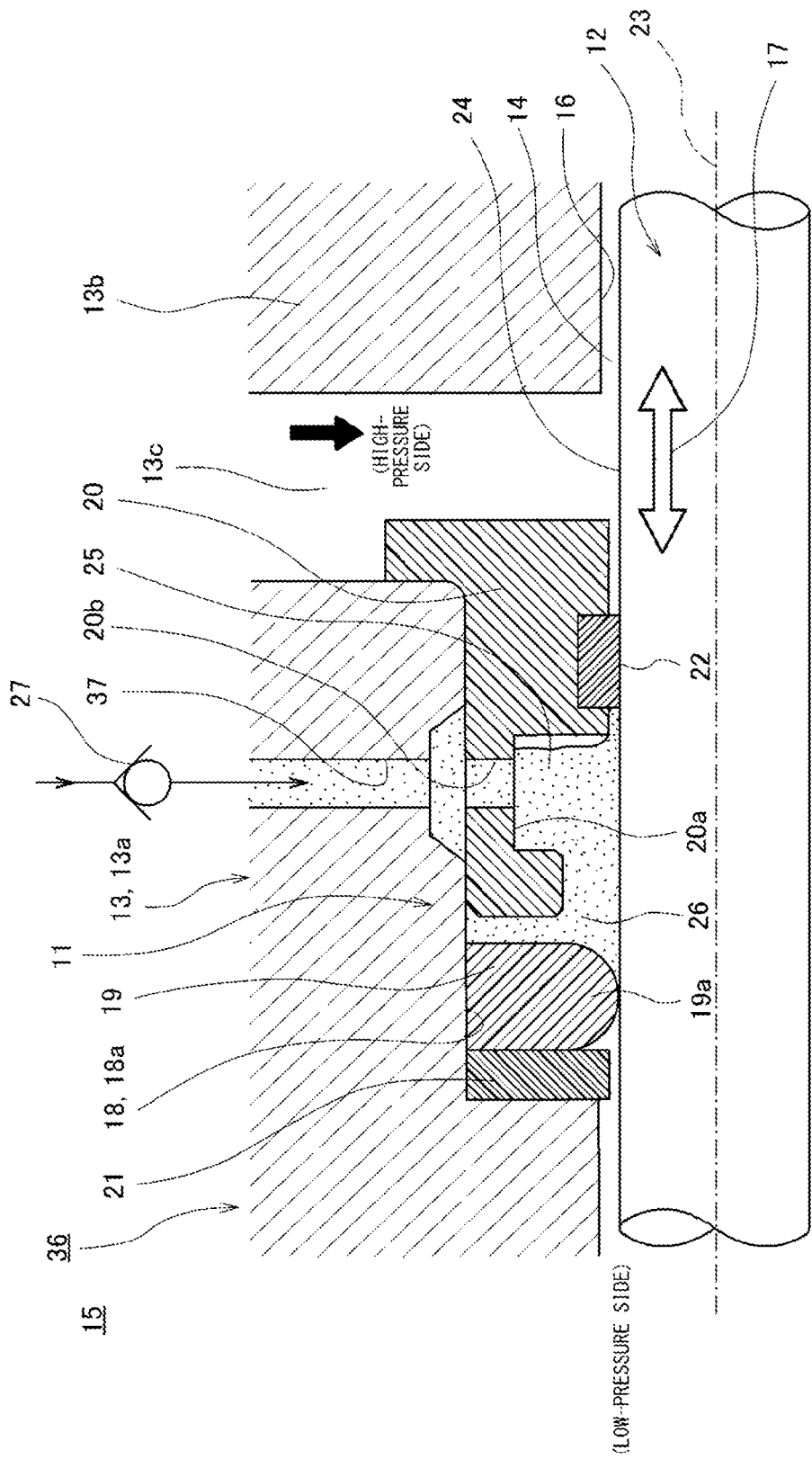
FIG. 3 is a partial schematic cross-sectional view showing a seal structure according to Embodiment 3 of the present invention.

Other than the above, the seal structure 36 according to Embodiment 3 shown in FIG. 3 is the same in configuration as the seal structure 40 according to Embodiment 1 shown in FIG. 1 and acts in the same manner as the seal structure 40 according to Embodiment 1 shown in FIG. 1. Therefore, the same reference signs are used for the same components, and explanations thereof are omitted.

As shown in FIG. 3, the supply passage 37 is a supply hole through which the lubricant 25 can be forcibly supplied from outside to the lubricant storage space 26 including the lubricant storage portion 20a by using, for example, a grease nipple. The supply passage 37 is formed at the first housing portion 13a of the second member 13 at which the attaching groove 18 is formed. An outer surface of the first housing portion 13a and the lubricant storage space 26 including the lubricant storage portion 20a communicate with each other through the supply passage 37.

As shown in FIG. 3, the lubricant storage portion 20a is a groove portion which is open toward the sliding surface 24. This groove portion and the supply passage 37 communicate with each other through a communication hole 20b formed at the lubricant holding piece 20.

A check valve 27 is disposed on the supply passage 37 shown in FIG. 3. The check valve 27 prevents the lubricant 25 in the lubricant storage space 26 and the seal target fluid (high-pressure fluid) at the high-pressure side from flowing out through the supply passage 37 to the low-pressure side.

According to the seal structure 36 of Embodiment 3, when the amount of lubricant 25 in the lubricant storage space 26 including the lubricant storage portion 20a decreases, the lubricant 25 can be forcibly supplied from outside through the supply passage 37 and the communication hole 20b to the lubricant storage space 26 including the lubricant storage portion 20a. With this, a state where an appropriate amount of lubricant 25 is supplied to the slide portion between the pressure fluid seal 19 and the sliding surface 24 can be maintained for a long period of time.

As shown in FIG. 3, since the groove portion as the lubricant storage portion 20a is open toward the sliding surface 24, the lubricant 25 held in the groove portion can easily flow out through the opening of the groove portion to be supplied to the sliding surface 24. Thus, the lubrication between the pressure fluid seal 19 and the sliding surface 24 can be surely performed. Since the lubricant 25 is supplied through the supply passage 37 and the communication hole 20b to the lubricant storage space 26 including the lubricant storage portion 20a, the lubrication between the pressure fluid seal and the sliding surface can be continuously, surely performed.

Figure 4:
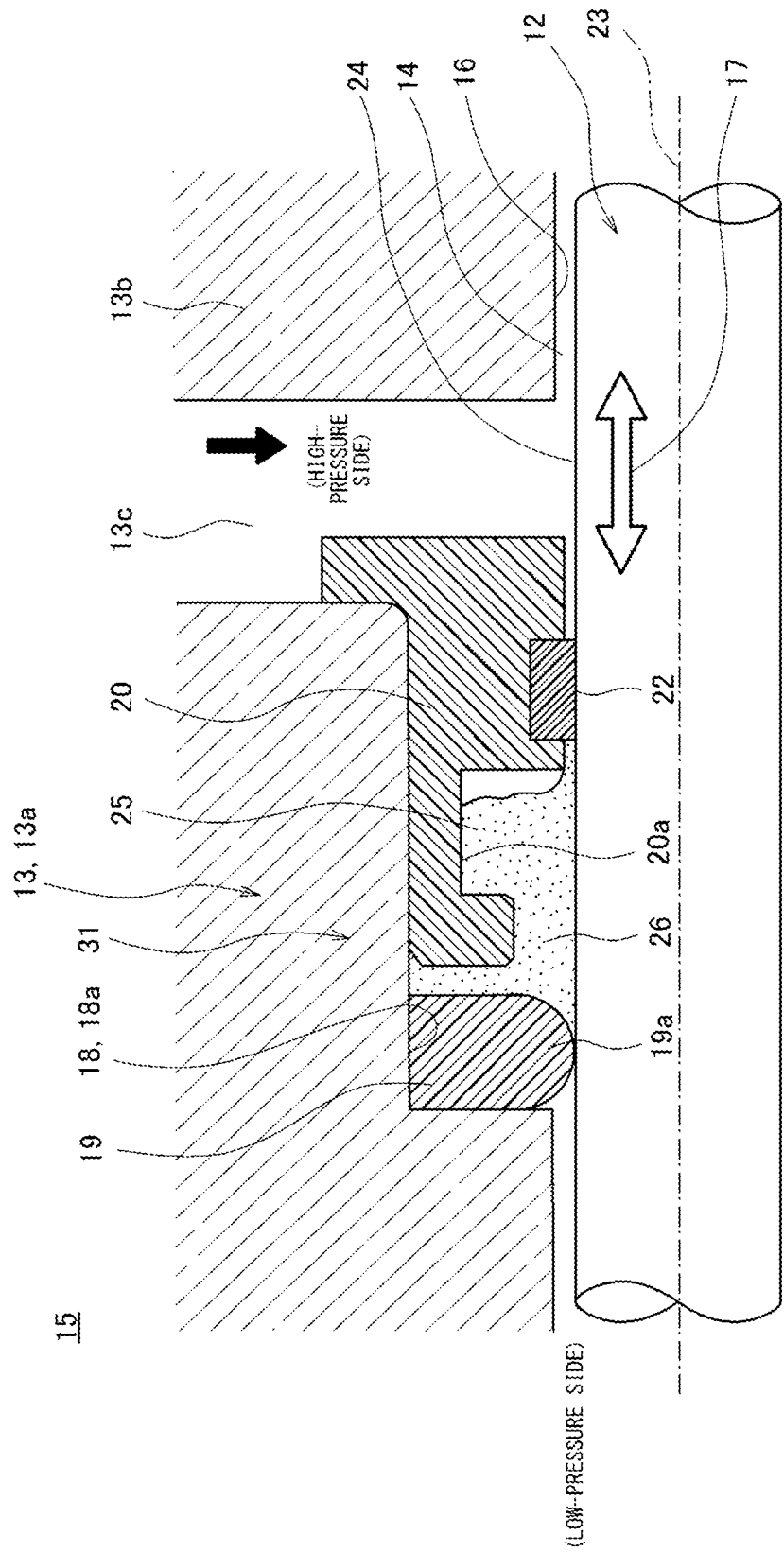
FIG. 4 is a partial schematic cross-sectional view showing a state where the sliding seal according to Embodiment 4 of the present invention is attached to the attaching groove of the second member.

Next, the sliding seals according to Embodiments 4 and 5 of the present invention will be explained in reference to FIGS. 4 and 5. A sliding seal 31 according to Embodiment 4 shown in FIG. 4 and the sliding seal 11 according to Embodiment 1 shown in FIG. 1 are different from each other in that: in Embodiment 1 shown in FIG. 1, the backup ring 21 is provided; and in Embodiment 4 shown in FIG. 4, the backup ring 21 is not provided. Other than the above, Embodiment 4 shown in FIG. 4 is the same in configuration as Embodiment 1 shown in FIG. 1, and explanations of the same components are omitted.

Figure 5:
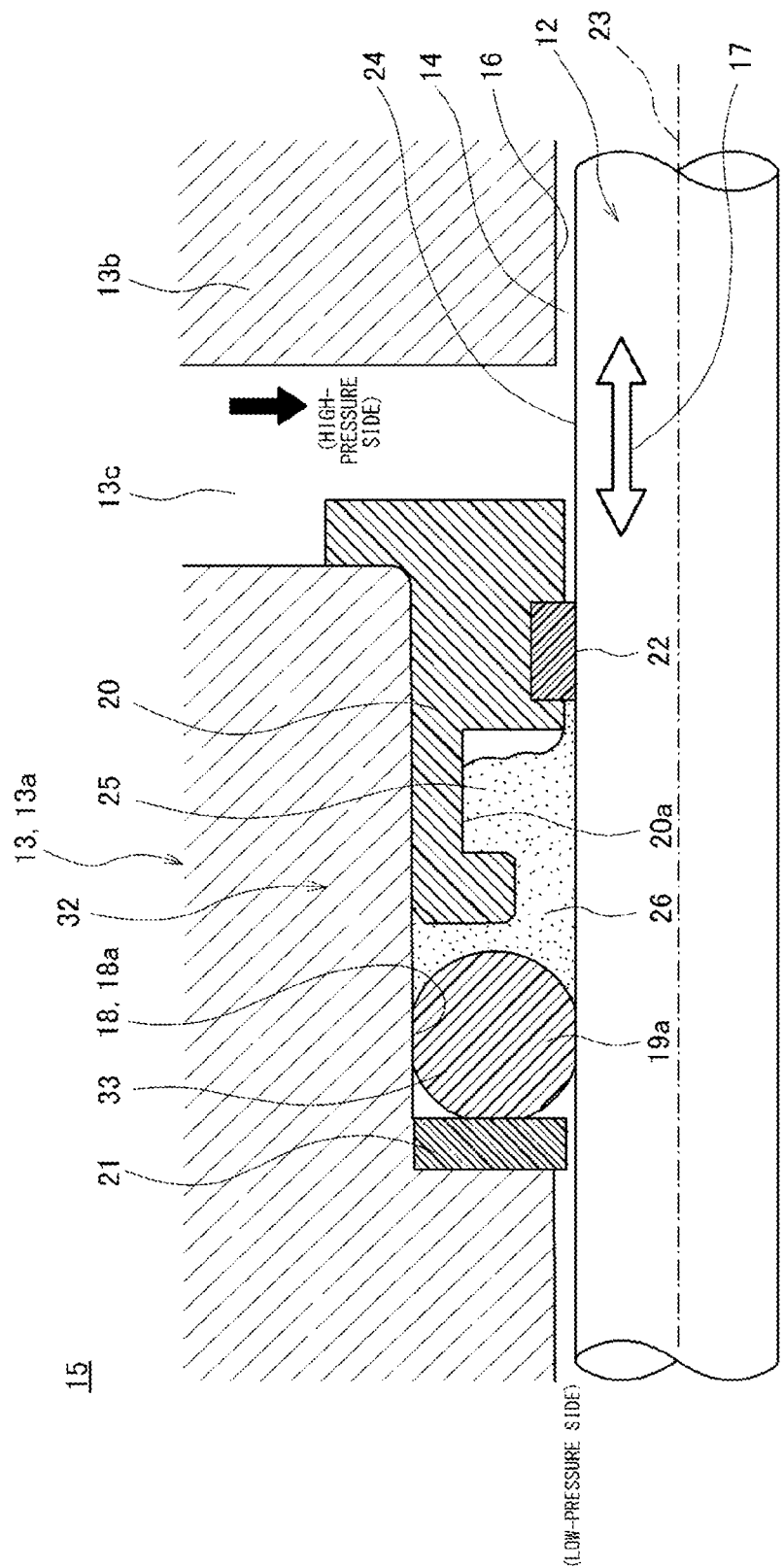
FIG. 5 is a partial schematic cross-sectional view showing a state where the sliding seal according to Embodiment 5 of the present invention is attached to the attaching groove of the second member.

A sliding seal 32 according to Embodiment 5 shown in FIG. 5 and the sliding seal 11 according to Embodiment 1 shown in FIG. 1 are different from each other regarding a pressure fluid seal 33 and the pressure fluid seal 19.

To be specific, a cross-sectional shape of the outer peripheral portion of the pressure fluid seal 19 shown in FIG. 1 is a substantially rectangular shape, and a cross-sectional shape of the inner peripheral portion 19a of the pressure fluid seal 19 shown in FIG. 1 is a substantially semi-circular shape. The pressure fluid seal 33 shown in FIG. 5 is an O ring having a circular cross-sectional shape. Other than the above, Embodiment 5 shown in FIG. 5 is the same in configuration as Embodiment 1 shown in FIG. 1, and explanations of the same components are omitted.

The foregoing has explained an example in which each of the sliding seals and the seal structures according to the above embodiments is applied as a component for sealing a portion which reciprocates. In addition to this, each of the sliding seals and the seal structures is applicable as a component for sealing a portion which rotates or a portion which performs a combined operation including the rotation and the reciprocation.

In each of the above embodiments, as shown in FIG. 1, the lubricant storage portion 20a is formed on the inner peripheral surface of the lubricant holding piece 20. However, the lubricant storage portion 20a may have a different shape or does not have to be formed.

Further, in each of the above embodiments, for example, as shown in FIG. 1, the sliding seal 11 is attached to the attaching groove 18 formed on the inner peripheral surface of the attachment hole 16 of the second member 13, and the pressure fluid seal 19 slidably contacts the sliding surface 24 that is the outer peripheral surface of the first member 12. However, instead of this, although not shown, the sliding seal may be attached to an attaching groove formed on the outer peripheral surface of the first member, and the pressure fluid seal may slidably contact a sliding surface that is the inner peripheral surface of the second member.

The material of the pressure fluid seal 19 and the material of the lubricant seal 22 are not limited to the examples described in the above embodiments. The lubricant seal 22 is only required to prevent the lubricant 25 from flowing out. For example, an O ring may be used as the lubricant seal 22.

In the above embodiment, the backup ring 21 is made of the synthetic resin or the engineering plastic that is one of the synthetic resins. However, the other material may be used for the backup ring 21. To be specific, the material of the backup ring 21 may be determined such that: the backup ring 21 has a strength capable of receiving the compressive force generated by the high pressure of the seal target fluid at the high-pressure side; and the inner peripheral portion 19a of the pressure fluid seal 19 does not get into the gap between the backup ring 21 and the sliding surface 24 by the deformation of the backup ring 21.

INDUSTRIAL APPLICABILITY

As above, each of the sliding seal and the seal structure according to the present invention has excellent effects of: realizing low start friction resistance and low sliding friction resistance; allowing the first member to smoothly move relative to the second member; and having a long life. Thus, the present invention is suitably applicable to the sliding seal and the seal structure.

REFERENCE SIGNS LIST 11, 29, 31, 32 sliding seal
12 first member
13, 43 second member (housing)
13a first housing portion
13b second housing portion
13c high-pressure passage
14 gap
15 device
16 attachment hole
17 movement direction
18 attaching groove
18a bottom surface
19, 33 pressure fluid seal (high-pressure seal)
19a inner peripheral portion
20 lubricant holding piece
20a lubricant storage portion
20b communication hole
21 backup ring
22 lubricant seal
23 center line
24 sliding surface
25 lubricant
26 lubricant storage space
27 check valve
36, 40 seal structure
37 supply passage

The invention claimed is:

1. A sliding seal assembly for use in a valve, the sliding seal assembly comprising:
a valve element and a housing, the valve element and the housing being movable relative to each other, an annular gap being formed between the valve element and the housing, an annular attaching groove being formed at one member out of the valve element and the housing;
a pressure fluid seal:
configured to seal the annular gap to divide the annular gap into a high-pressure space and a low-pressure space,
arranged at the attaching groove, and
configured to slidingly contact a sliding surface of an other member out of the valve element and the housing;
a lubricant holding piece spaced apart from the pressure fluid seal so as to be located close to the high-pressure space and provided at the attaching groove so as to be fixed to the one member, a lubricant storage space being formed between the lubricant holding piece and the pressure fluid seal and storing a lubricant; and
a lubricant seal provided closer to the high-pressure space than the lubricant storage space and configured to slidingly contact the sliding surface to isolate the high-pressure space and the lubricant storage space from each other, wherein
a compression amount of a lip of the pressure fluid seal is larger than a compression amount of a lip of the lubricant seal;
the lubricant holding piece is formed in an annular shape and includes a lubricant storage portion at an inner peripheral surface thereof, the lubricant storage portion being an annular groove and connected to the lubricant storage space; and
a passage connecting the lubricant storage space and the high-pressure space is not formed.

2. The sliding seal assembly according to claim 1, wherein the lubricant seal is formed separately from the lubricant holding piece.

3. The sliding seal assembly according to claim 1, further comprising a backup ring provided adjacent to a low-pressure side surface of the pressure fluid seal.

4. A seal structure comprising:
the sliding seal assembly according to claim 1; and
a supply passage formed at the second or first member at which the attaching groove is provided, a lubricant being supplied from outside through the supply passage to the lubricant storage space.

5. The seal structure according to claim 4, wherein:
the lubricant storage portion is a groove portion which is open toward the sliding surface; and
the groove portion and the supply passage communicate with each other through a communication hole formed at the lubricant holding piece.

6. A sliding seal assembly comprising:
a valve element and a housing, the valve element and the housing being movable relative to each other, an annular gap being formed between the valve element and the housing, an annular attaching groove being formed at one member out of the valve element and the housing;
a pressure fluid seal:
configured to seal the annular gap to divide the annular gap into a high-pressure space and a low-pressure space,
arranged at the attaching groove, and configured to slidingly contact a sliding surface of an other member out of the valve element and the housing;

a lubricant holding piece spaced apart from the pressure fluid seal so as to be located close to the high-pressure space and provided at the attaching groove so as to be fixed to the one member, a lubricant storage space being formed between the lubricant holding piece and the pressure fluid seal and storing a lubricant; and a lubricant seal provided closer to the high-pressure space than the lubricant storage space and configured to slidingly contact the sliding surface to isolate the high-pressure space and the lubricant storage space from each other, wherein:

the lubricant holding piece is formed in an annular shape and includes a lubricant storage portion at an inner peripheral surface thereof, the lubricant storage portion being an annular groove and connected to the lubricant storage space;

a compression amount of a lip of the pressure fluid seal is larger than a compression amount of a lip of the lubricant seal;

the lubricant seal is provided at the lubricant holding piece;

the lubricant holding piece is arranged in the attaching groove and at a position close to the high-pressure space; and a passage connecting the lubricant storage space and the high-pressure space is not formed.

7. The sliding seal assembly according to claim 6, wherein the lubricant seal is formed integrally with the lubricant holding piece.

\* \* \* \* \*